United States Patent [19]

Tanabe et al.

[11] Patent Number: 5,588,079
[45] Date of Patent: Dec. 24, 1996

[54] OPTICAL CONNECTOR

[75] Inventors: Takashi Tanabe; Kouji Yamamoto, both of Tokyo, Japan

[73] Assignee: NEC Corporation, Japan

[21] Appl. No.: 390,471

[22] Filed: Feb. 17, 1995

[51] Int. Cl.⁶ .................................................. G02B 6/36
[52] U.S. Cl. ........................................................ 385/78
[58] Field of Search ............................ 385/53, 60, 61, 385/66, 67, 72, 78, 79, 62, 81, 84, 92

[56] References Cited

U.S. PATENT DOCUMENTS 5,285,510  2/1994  Slaney ........................................ 385/78

FOREIGN PATENT DOCUMENTS

| 1190777 | 7/1985 | Canada | 385/78 |
|---|---|---|---|
| 57-74714 | 5/1982 | Japan. | |
| 59-125706 | 7/1984 | Japan. | |
| 62-7009 | 1/1987 | Japan. | |
| 62-138805 | 6/1987 | Japan. | |
| 62-205303 | 9/1987 | Japan. | |
| 63-78906 | 5/1988 | Japan. | |
| 63-305306 | 12/1988 | Japan | 385/78 |
| 325405 | 2/1991 | Japan. | |

*Primary Examiner*—John Ngo
*Attorney, Agent, or Firm*—Whitham, Curtis, Whitham & McGinn

[57] ABSTRACT

An optical connector has a ferrule with an flange having a polygonal cross-section, and a housing into which the ferrule is inserted. The housing has a stopper to be in contact with a side surface of the flange for regulating a position of the ferrule, a guide member for guiding the ferrule in the housing, the guide member having a regulation portion for finally regulating the position of the flange, and a slope portion on which the flange slides for guiding the ferrule to the regulation portion.

6 Claims, 10 Drawing Sheets

FIG.3 PRIOR ART
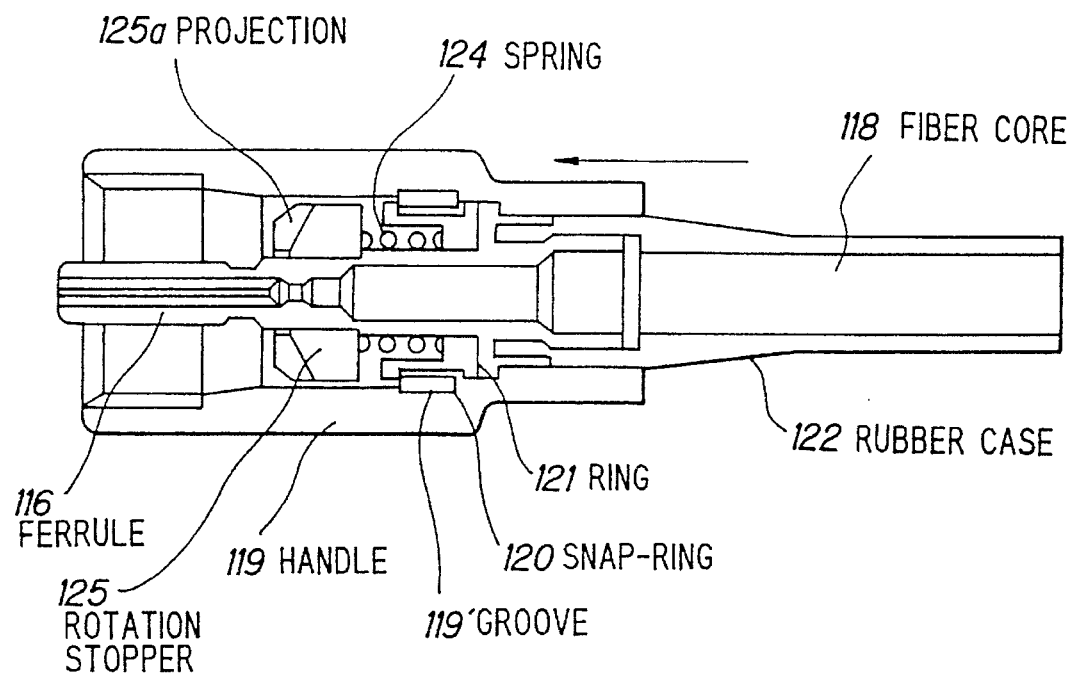
FIG.4 PRIOR ART
FIG.5 PRIOR ART
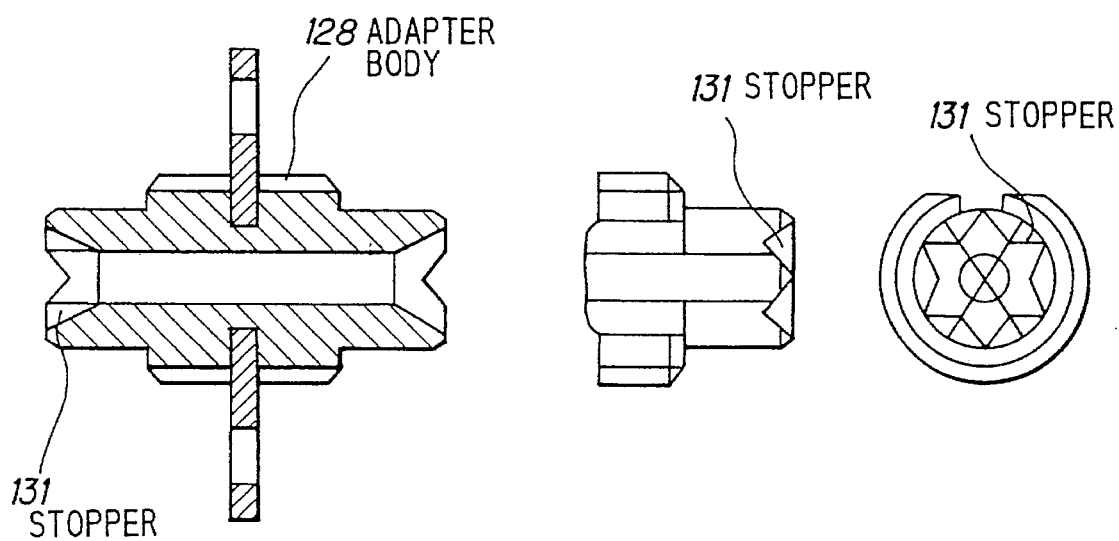

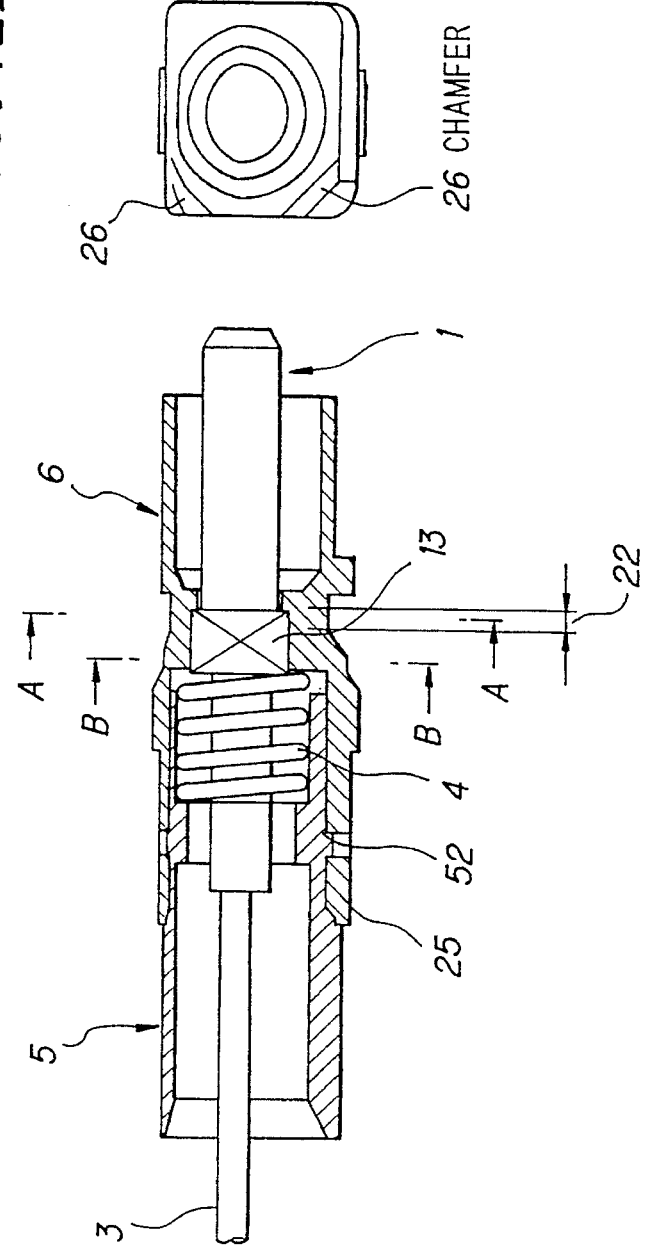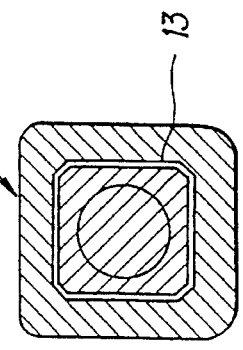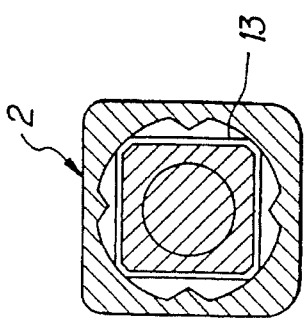

5,588,079

1

OPTICAL CONNECTOR

FIELD OF THE INVENTION

The invention relates to an optical connector, especially to mechanism for aligning and supporting a ferrule in a housing.

BACKGROUND OF THE INVENTION

There have been some conventional optical connectors, described in Japanese Patent Publications Kokai Showa 57-74714, Kokai Showa 59-125706, Kokai Showa 62-7009, Kokai Showa 62-138805, Kokai Showa 62-205303 and Kokai Heisei 3-25405 and a Utility Model Publication Kokai Showa 63-78906.

According to one of the above mentioned conventional optical connectors, a ferrule has a flange with projections and a housing has grooves to be engaged with the projections of the ferrule so that the ferrule and the housing are aligned to each other in assembly. Although, the grooves and the projections are required to be precisely adjusted in position with the hands of a user, it is difficult to get precise adjustment of them, because it is hard to look at the inside of the housing. Therefore, the eccentric direction of an optical fiber may be deviated from the key of the housing, and whereby the optical connector itself may be misassembled.

SUMMARY OF THE INVENTION

Accordingly, an object of the invention is to provide an improved optical connector in which a ferrule and a housing are aligned to each other easily and precisely.

According to the invention, an optical connector has a ferrule with an flange having a polygonal cross-section, and a housing into which the ferrule is inserted. The housing has a stopper to be in contact with a front surface of the flange for regulating a position of the ferrule, a guide member for guiding the ferrule in the housing, the guide member having a regulation portion for finally regulating the position of the flange, and a slope portion on which the flange slides for guiding the ferrule to the regulation portion.

Preferably, the regulation portion includes a surrounding member formed to be a similar figure to the periphery of the flange for surrounding the periphery of the flange. Each of the periphery of the flange and the shape of the internal diameter of the regulation portion is shaped to be unsymmetrical. Each of the slope portion and the flange has at least one chamfer so that the flange of the ferrule can be guided into the housing smoothly by the guide member.

BRIEF DESCRIPTION OF THE DRAWINGS

FIG. 3 is a sectional view illustrating a vertical section of a second conventional optical connector.

FIG. 4 is a cross-sectional view illustrating an adapter to be engaged with the optical connector shown in FIG. 3.

FIG. 5 shows side and front views of a receptacle to be engaged with the optical connector shown in FIG. 3.

2

Figure 6:
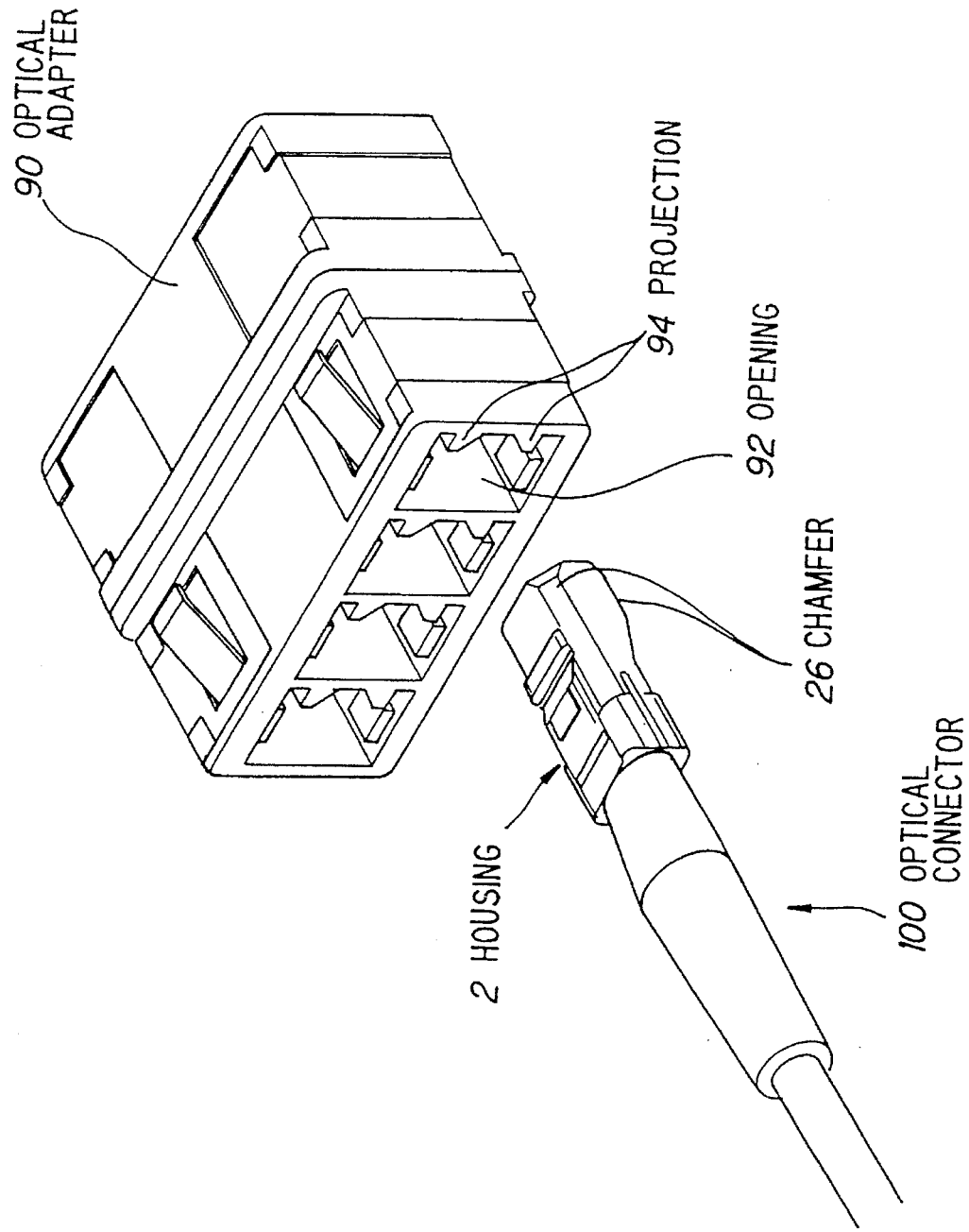

FIG. 6 is a perspective view illustrating the relation in location between an optical adapter and an optical connector of a first preferred embodiment according to the invention.

Figure 7:
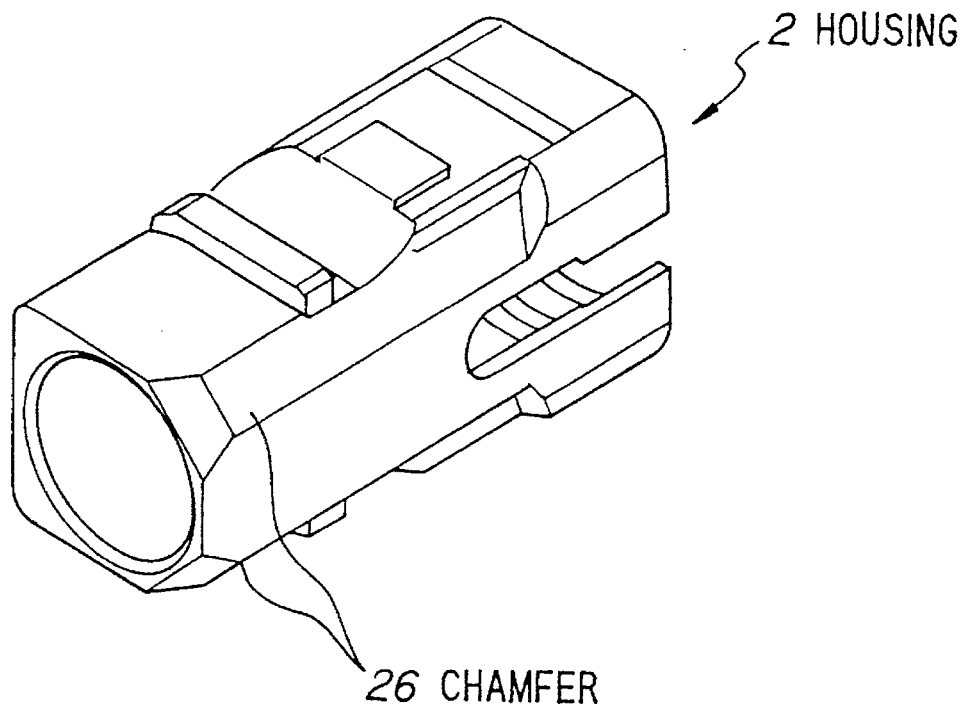

FIG. 7 is a perspective view illustrating a housing of the optical connector shown in FIG. 6.

Figure 8:
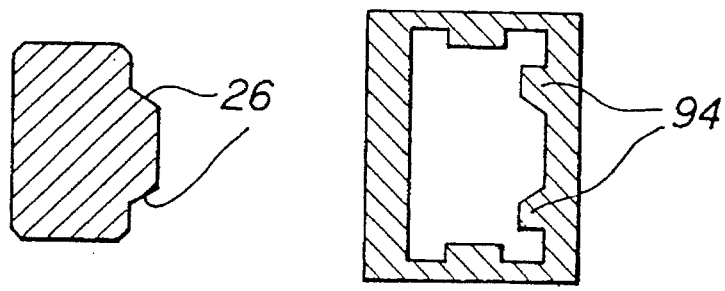

FIG. 8 shows cross sections of the housing and the optical adapter shown in FIG. 6.

Figure 9:
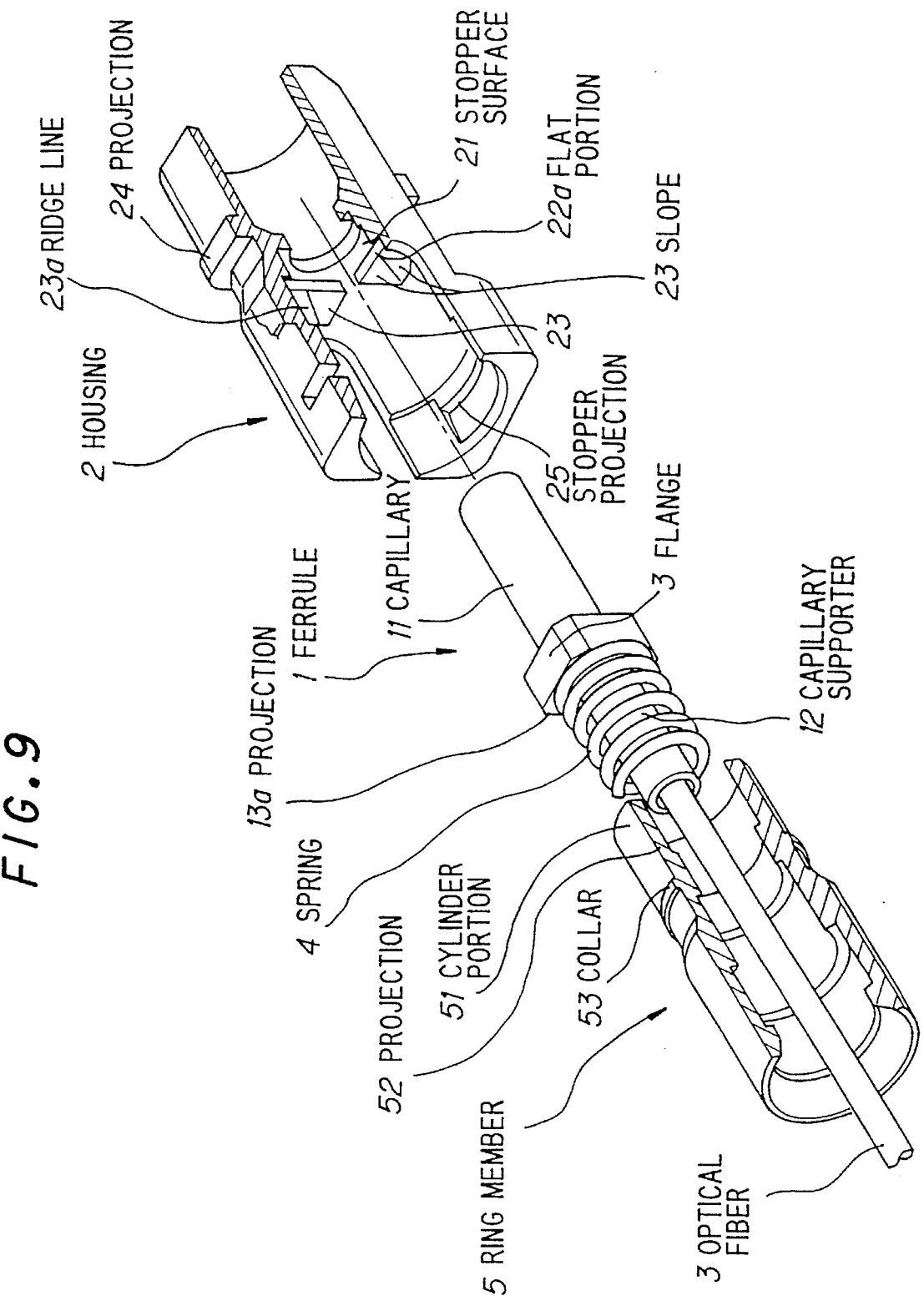

FIG. 9 is a perspective view showing an assembly drawing of the optical connector shown in FIG. 6.

Figure 10:
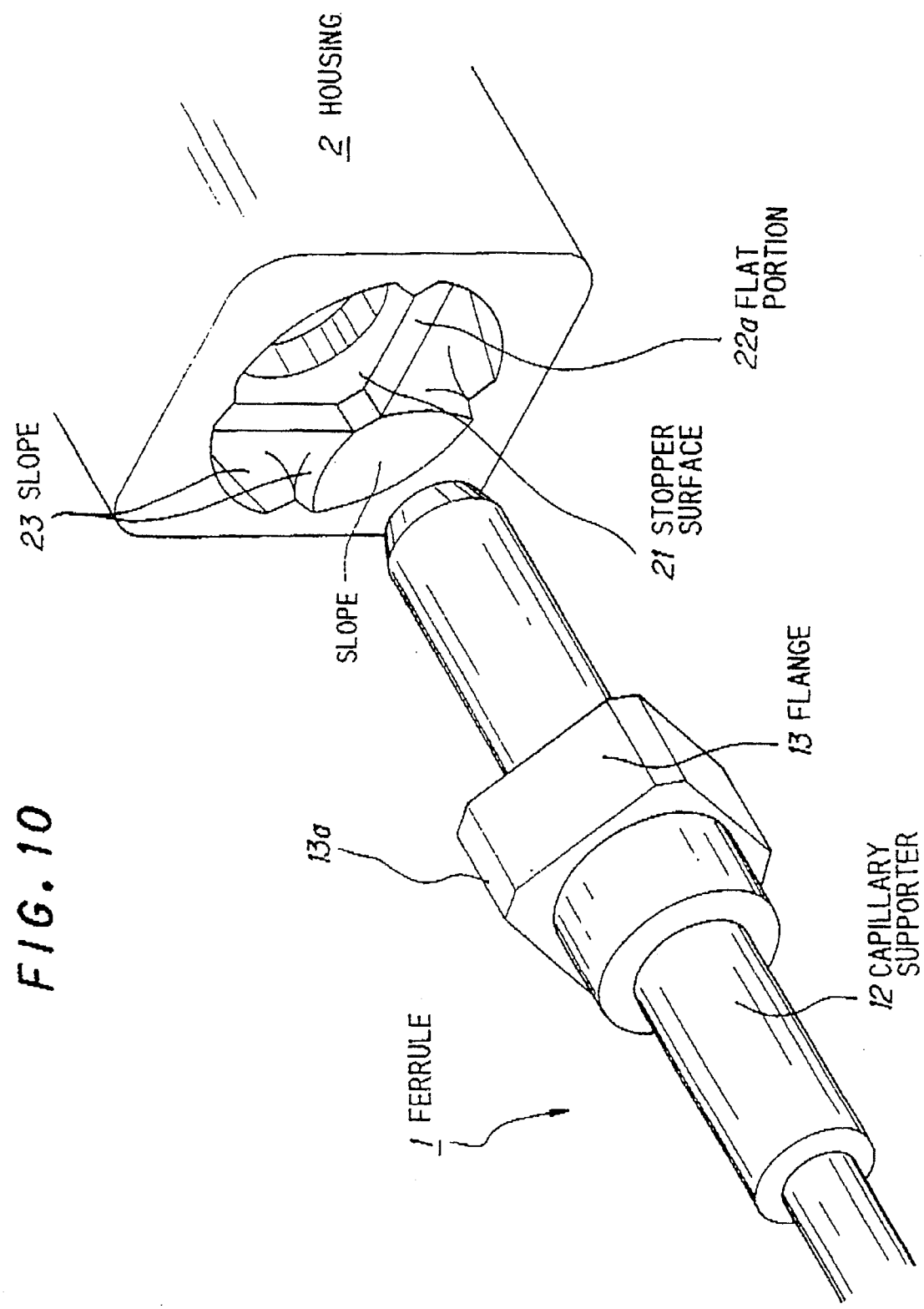

FIG. 10 is a perspective view showing the relation between the housing and a ferrule of the first preferred embodiment.

Figure 11:
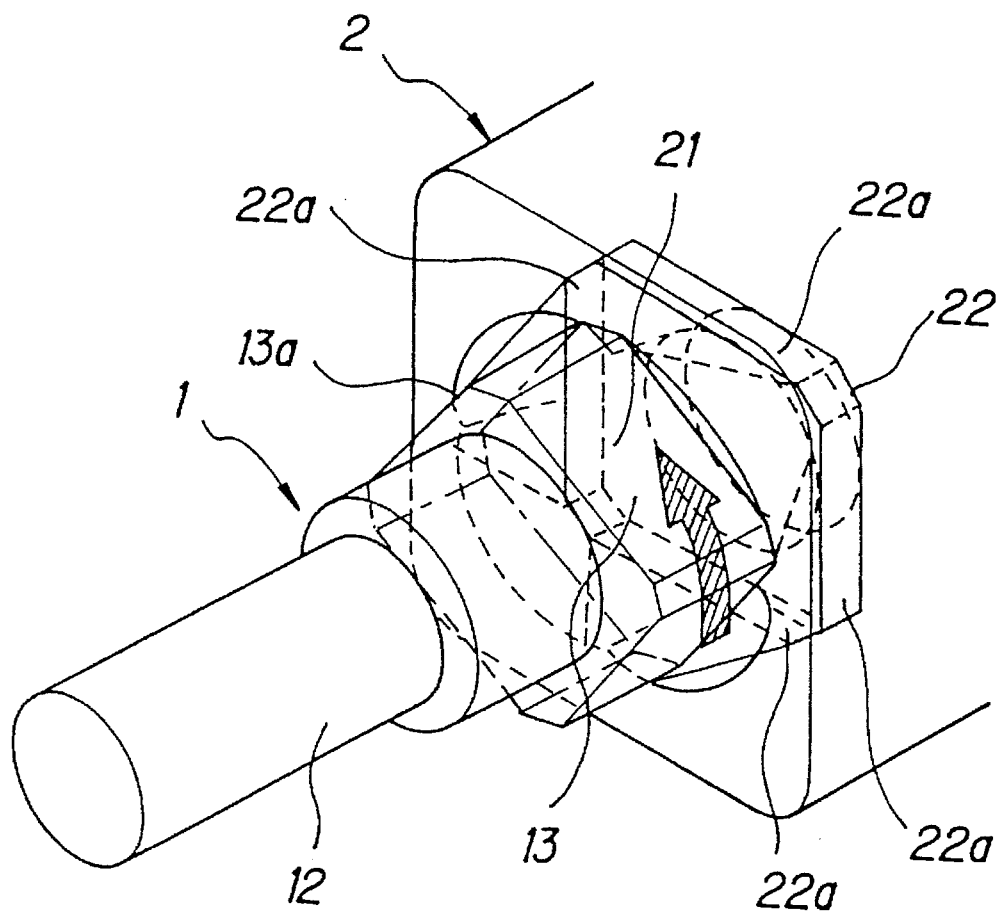

FIG. 11 is a perspective view showing the operation of the first preferred embodiment.

FIG. 12A is a sectional view showing a vertical section of the optical connector of the first preferred embodiment.

FIG. 12B is a side view looking from the left side of the optical connector shown in FIG. 12A.

FIG. 13 is a cross-sectional view taken on line B—B of FIG. 12A.

FIG. 14 is a cross-sectional view taken on line A—A of FIG. 12A.

Figure 15:
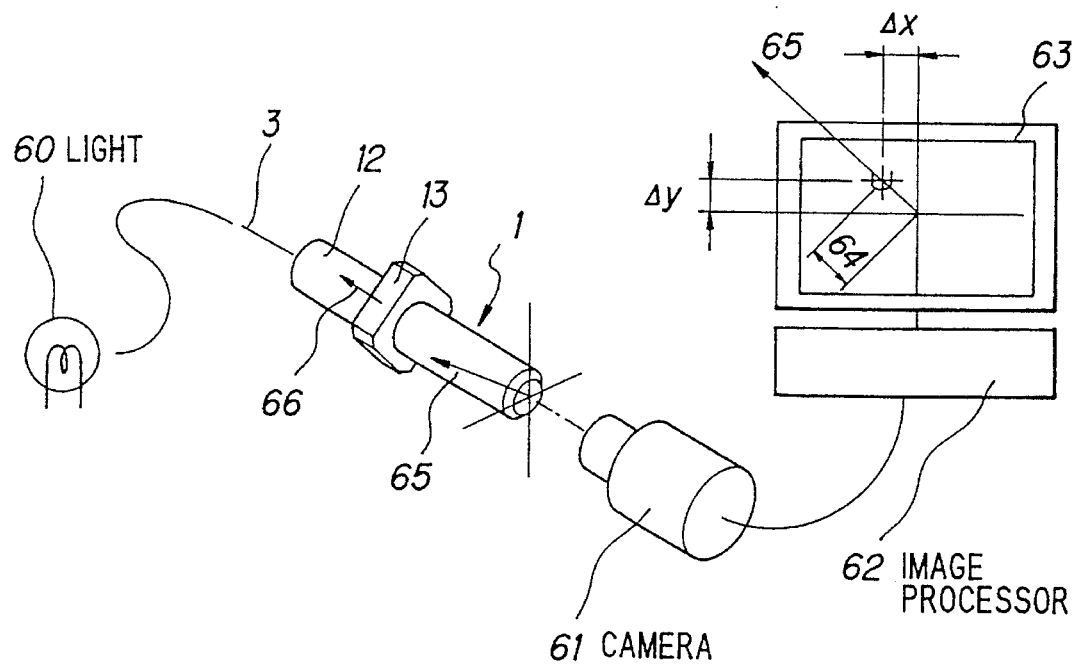

FIG. 15 is an explanatory view showing the operation of the first preferred embodiment.

Figure 16:
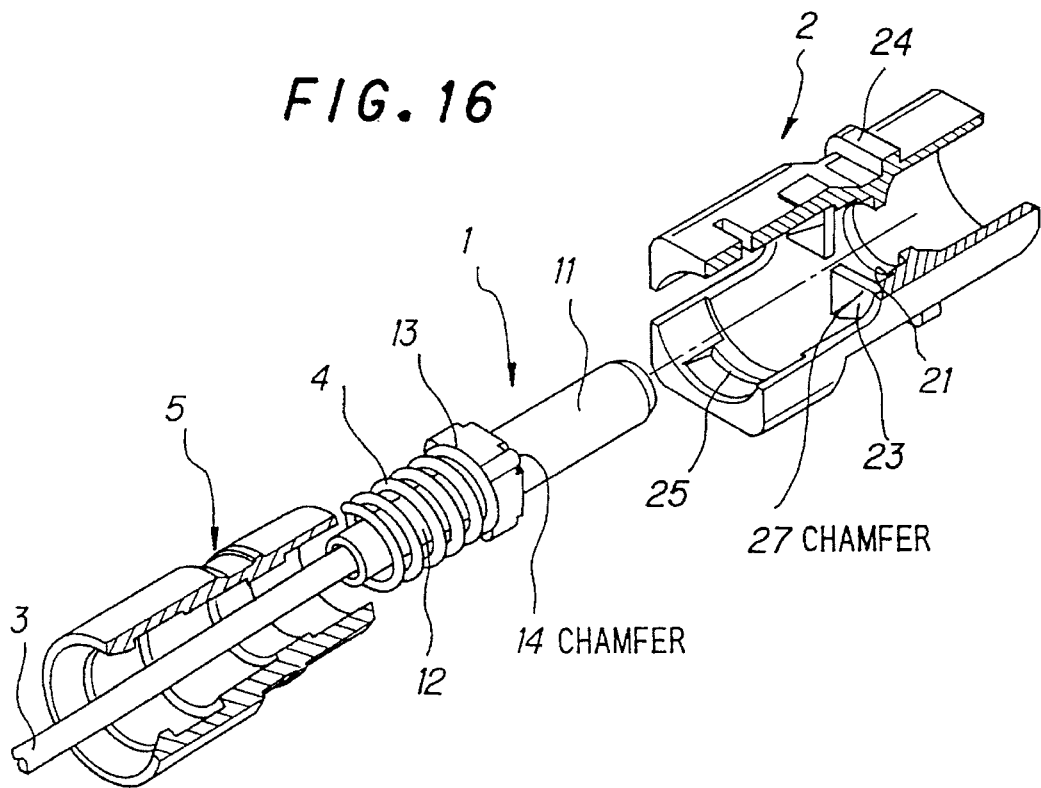

FIG. 16 is a perspective view showing an assembly drawing of an optical connector of a second preferred embodiment according to the invention.

Figure 19:
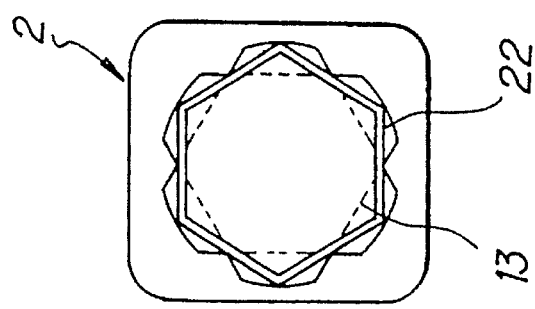
Figure 18:
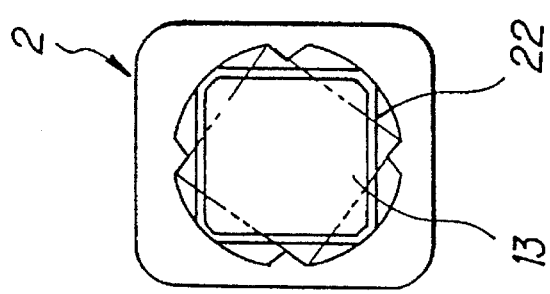
Figure 17:
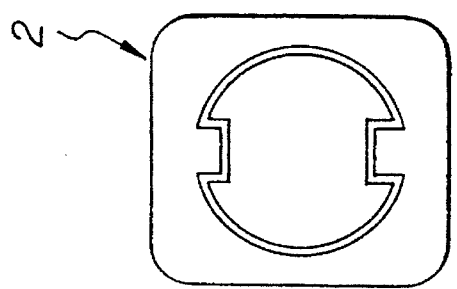

FIGS. 17 to 19 are explanatory views used for comparing the invention with the conventional technology.

DESCRIPTION OF THE PREFERRED EMBODIMENTS

Figure 1B:
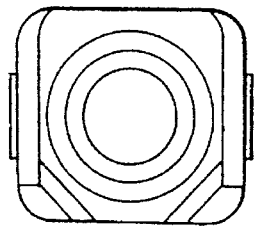
FIG. 1B is a side view looking from the left side of the optical connector shown in FIG. 1A.
Figure 1A:
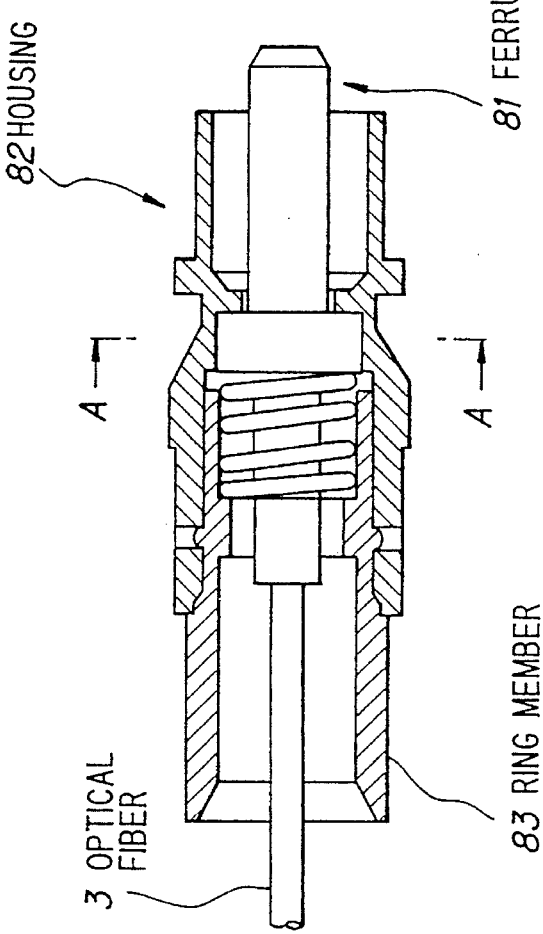
FIG. 1A is a sectional view showing a vertical section of a first conventional optical connector.
Figure 2:
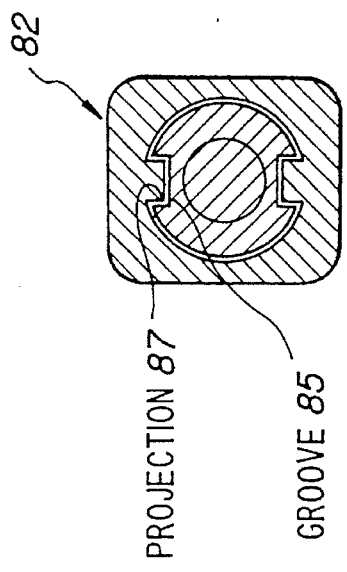
FIG. 2 is a cross-sectional view taken on line A—A of FIG. 1A.

For better understanding the invention, conventional technology is first described as references. FIGS. 1A, 1B and 2 show a conventional optical connector including a ferrule 81 into which an optical fiber 3 is inserted, a housing 82 into which the ferrule 81 is inserted, and a ring member 83 supporting the ferrule 81 in the housing 82. The housing 82 is provided on top and bottom of its inner surface with two projections 87 to be engaged with grooves 85 provided at a flange of the ferrule 81. Instead of the combination of the projections of the housing 82 and the grooves of the ferrule 81, the housing 82 may be provided on the inner surface with grooves to be engaged with projections on the flange of the ferrule 81 so as to have the same function.

In assembly, the ferrule 81 is inserted into the housing 82 so that the grooves 85 and the projections 87 are engaged to each other, and whereby the ferrule 81 and the housing 82 are aligned to each other. According to the above mentioned conventional optical connector shown in FIG. 1, the grooves 85 and the projections 87 are required to be precisely adjusted in position with hands of a user. However, it is difficult to get precise adjustment of them, because it is hard to look at the inside of the housing 82. Therefore, the eccentric direction of the core of the optical fiber 3 can be misaligned relative to a key of the housing 82, and whereby the optical connector itself may be mis-assembled. Further, it is difficult to align the ferrule 81 and the housing 82 to each other automatically.

FIG. 3 shows another conventional optical connector, shown in Japanese Patent Publication Kokai Showa 57-74714, including a ferrule 116 into which an optical fiber (fiber core 118) is inserted, a handle 119 (body), a rubber case 122, a spring 124, a snap-ring 120, a ring 121, and a rotation stopper 125 which is provided with wedge-shape projections 125a. The handle 119 is provided on the inner surface with a groove 119'. FIGS. 4 and 5 show an adapter and receptacle each for receiving the optical connector. Each of the adapter and receptacle is provided with wedge-shape stoppers 131 to be engaged with the wedge-shape projections 125a.

In the above mentioned conventional optical connector, the connector can be inserted into the adapter or the receptacle smoothly without any alignment between them. However, when the optical connector fits in the receptacle, the ferrule 116 can be rotated if the optical fiber is twisted; and therefore, the end surface of the ferrule 116 may be deviated from the proper position, that is the mechanical reference surface in the receptacle. If the optical connector fits in the adapter, some space can be made between the wedge-shape projections 125a and the wedge-shape stoppers 131; and therefore, it becomes difficult to align the optical connector to the adapter precisely. This kind of problem is remarkably bad in the case of single mode optical fiber and a PC (Physical Contact) type of optical connector, in which two optical fibers are directly in contact with each other for preventing reflection between the two optical fibers.

FIG. 6 shows an optical connector 100 of a first preferred embodiment and an optical adapter 90 in which the optical connector 100 is inserted. The optical connector 100 is an F04 type of single axis optical fiber connector defined by C5973 in the JIS (Japanese Industry Standards). The optical connector 100 employs a push-on connection system of slide lock structure, but-joint system for optical connection, a plug-adapter-plug for mechanical connection, and a ferrule structure of 2.5 mm for optical fiber arrangement.

The optical connector 100 is provided at an end with a housing 2 shaped as shown in FIG. 7. The housing 2 basically has a square shape of cross-section and chamfers 26 at two corners so as to shape the housing 2 unsymmetrical. The optical adapter 90 has openings 92 into which the housing 2 of the optical connector 100 is inserted, as shown in FIG. 8. In the cross section of the opening 92, two projections 94 are provided so as to be in contact with the chafers 26.

FIG. 9 shows the structure of the optical connector 100, which includes a ferrule 1, the housing 2 into which the ferrule 1 is inserted and a ring member 5 for supporting the ferrule 1 from the rear end. The ferrule 1 includes a capillary 11 which is provided inside with a longitudinal hole in which an optical fiber 3 is supported precisely, and a capillary supporter 12 which is provided at an end with a flange 13 having a projection 13a for preventing the capillary 11 from any rotation. The flange 13 is shaped to have a square cross section.

The housing 2 is made of synthetic resin for free shaping, that is, the housing can be shaped freely by injection mold formation, and mass-production can be realized easily. The housing 2 is provided on the periphery with an engagement projection (flange) 24 to be engaged with an elastic projection (not shown) of the optical adapter. The housing 2 is shaped to have a square cross section, which is the same as the optical adapter, so as to prevent rotation in the optical adapter. As described before, the chamfers 26 of the housing 2 are shaped to be in contact with the alignment projections 94 of the optical adapter so that the housing 2 always faces one direction in the optical adapter.

The housing 2 is provided the inside thereof with a stopper surface 21 to be in contact with the front surface of the flange 13 in order to stop the ferrule 1 from penetrating through the housing 2, as shown in FIGS. 9, 10 and 11. On the stopper surface 21, there is a guide member 22 composed of flat portions 22a and slope portions 23. Each slope portion 23 is divided into two by the ridge line 23a, which has a slope getting larger at the closest portion to the ferrule 1. The housing 2 is also provided with a stopper projection 25 to be engaged to a collar 53 of the ring member 5 for fixing the ring member 5.

As shown in FIGS. 9, 12A, 12B, 13 and 14, the ferrule 1 includes the capillary 11, a capillary supporter 12, a spring 4 arranged to surround the capillary supporter 12, and the flange 13. The spring 4 is arranged to be in contact at one end with the rear surface of the flange 13 and at the other end with a projection 52 of the ring member 5. The spring 4 is compressed while the optical connector is assembled so as to keep pushing the ferrule 1 to the housing 2.

The ring member 5 includes a cylinder portion 51 having a external diameter slightly larger than that of the flange 13, and the projection 52, and the collar 53 to be engaged with the stopper projection 25 of the housing 2.

Next, steps 1 to 4 for assembling the optical connector are now described. In step 1, before inserting the ferrule 1 into the housing 2, light 60 is supplied into the optical fiber 3 and the light is monitored by a camera 61 from the tip of the capillary 11, as shown in FIG. 15. The light pattern taken by the camera 61 is processed by an image processor 62 to obtain eccentricity length 64 and eccentricity direction 65 of the center of the optical fiber 3 relative to the center of periphery of the ferrule 1. The orthogonal direction to the flat portion of the flange 13 which is arranged closest to the eccentricity direction 65 is assumed as an eccentric assumption angle 66.

In step 2, the ferrule 1 is inserted into the housing 2 while matching the flat surface of the flange 13, on which the eccentric assumption angle 66 is located, to the surface of the chamfer 26 of the housing 2. In this step, even if those angles are deviated from each other, the projection 13a of the flange 13 is in contact with the slope 23 of the housing 2, so that the ferrule 1 is rotated and the flange 13 is automatically engaged in the space surrounded by the flat portions 22a smoothly. The ferrule 1 keeps being inserted until the flange 13 of the ferrule 1 is in contact with the stopper surface 21 of the housing 2. In this step, even if the flange 13 is deviated by about 35 degrees from the proper position relative to the chamfer 26 of the housing 2, the ferrule 1 can be engaged into the housing 2 perfectly. In contrast, with the conventional technology, the deviation angle should be within 5 degrees.

In step 3, the spring 4 is set in the housing 2. In step 4, when the ring member 5 is inserted into the housing 2, the projection 52 is first in contact with the spring 4, and the spring 4 is compressed. Subsequently, the collar 53 of the ring member 5 is engaged with the stopper projection 25 of the housing 2, and the step 3 is completed. The ferrule 1 is pushed forward by the spring 4, so that stable optical connection can be realized.

In the above described embodiment the flange 13 has a square cross section, however, the cross section may be another polygon, such as hexagon as shown in FIG. 19.

FIG. 16 shows an optical connector of a second preferred embodiment according to the invention, which is basically similar to the first preferred embodiment shown in FIG. 9, so that only the difference from the first preferred embodiment will be described in detail. In the second preferred embodiment, chamfers 14 are formed on the corners of the flange 13 of the ferrule 1 facing to the housing 2, and chamfers 27 are formed on portions interfering with the flange 13. With those chamfers 14 and 27, the ferrule 1 can be inserted more smoothly into the housing 2 relative to the first preferred embodiment. The capillary supporter 12 of the ferrule is made of synthetic resin for free shaping.

Next, how easy the ferrule can be aligned in the housing with the present invention will be explained relative to conventional technology. FIGS. 17 to 19 show engagement situations with conventional optical connector, optical connectors of the present invention, respectively. FIGS. 18 and 19 respectively show situations in which square and hexagon types of flanges are used. In case where a ferrule is inserted into a housing at random in angle, the rate (X) of impossibility to insert the ferrule into the housing can be calculated by the following equation:

X=(Range of Interference Angle)×(Number of Proper Engagement Possibility per Rotation)/360 degree In FIGS. 17 through 19, each space between the housing and ferrule is 0.2 mm.

The ranges of interference angle are 170°, 20° and 11.5° according to the cases of FIGS. 17, 18 and 19, respectively. Finally, value "X" are "0.94", "0.22" and "0.19" for those cases, respectively, which are calculated as follows:

X=170×2/360=0.94

X=20×4/360=0.22

X=11.5×6/360=0.19

As understood from the above evaluation, according to the invention, cases of FIGS. 18 and 19, it is 4 to 5 times easier as much to insert a ferrule into a housing as compared to the conventional technology. Further, according to the second preferred embodiment shown in FIG. 16, in which the flange 13 of the ferrule 1 and the slope portion 23 of the housing 2 are provided with chamfers 14 and 27, respectively, the rate of mis-insert can be almost zero %.

As described above, according to the invention, a ferrule can be inserted and aligned in a housing easily and precisely; and therefore, the optical connector can be aligned in an optical adapter precisely as well.

Although the invention has been described with respect to specific embodiments for complete and clear disclosure, the appended claims are not to be thus limited but are to be construed as embodying all modification and alternative constructions that may occur to one skilled in the art which fairly fall within the basic teaching herein set forth.

What is claimed is:

1. An optical connector, comprising:
    a housing having a round opening with equally spaced pointed ridges positioned around the periphery of said round opening, said round opening including a guide for receiving a ferrule for an optical fiber, said guide comprising:
    a first tier comprising:
        first sloped portions extending down a side of said equally spaced pointed ridges;
        second, rounded sloped portions, adjacent said first sloped portions;
    a second tier comprising:
        first rectangular flat surfaces abutting said first sloped portions centered about said equally spaced pointed ridges; and
        second rectangular flat surfaces positioned between two of said first rectangular flat surfaces;
    a stopper surface positioned at a bottom end of said second tier, said stopper surface having a round center opening; and
    a ferrule, comprising:
        a capillary support for supporting an optical fiber;
        a capillary being insertable into said round center opening of said stopper surface; and
        a flange, connected between said capillary and said capillary support and shaped to fit into said second tier to hold said ferrule in a stationary position when said flange is guided by said first tier into said second tier against said stopper surface.

2. An optical connector as recited in claim 1 wherein said housing has four equally spaced pointed ridges.

3. An optical connector as recited in claim 1 wherein said housing has six equally spaced pointed ridges.

4. An optical connector as recited in claim 1 further comprising a spring positioned around said capillary support abutting against said flange.

5. An optical connector as recited in claim 1 wherein said capillary has a beveled tip.

6. An optical connector as recited in claim 1 wherein said flange has chamfered edges.

* * * * *